United States Patent [19]

Cosenza

[11] 3,995,675
[45] Dec. 7, 1976

[54] CAPTIVE PANEL FASTENER ASSEMBLY

[75] Inventor: Frank J. Cosenza, Palos Verdes Peninsula, Calif.

[73] Assignee: Tridair Industries, Torrance, Calif.

[22] Filed: Feb. 10, 1975

[21] Appl. No.: 548,470

[52] U.S. Cl. .............................................. 151/69
[51] Int. Cl.² ....................................... F16B 43/00
[58] Field of Search ............... 151/69, 41.7, 41.72, 151/68, 31; 85/8.8, 9 R, 53

[56] References Cited
UNITED STATES PATENTS

| | | | |
|---|---|---|---|
| 2,949,143 | 8/1960 | Shur | 151/69 |
| 3,151,653 | 10/1964 | Zahodiakin | 151/69 X |
| 3,267,793 | 8/1966 | Devine et al. | 151/69 X |
| 3,294,140 | 12/1966 | Cosenza | 151/69 X |
| 3,361,176 | 1/1968 | Jansen | 151/69 X |

FOREIGN PATENTS OR APPLICATIONS

| 6,607 | 3/1901 | United Kingdom | 85/53 |
|---|---|---|---|

*Primary Examiner*—Ramon S. Britts

[57] ABSTRACT

A captive panel fastener assembly comprising a stud having three splines substantially along its length, a retaining ring with inwardly extending tabs slidably riding within said splines and a plug press-fitted to a bore at the forward end of the stud. After insertion of the stud through a hole in a panel, to which the stud is to be captivated, the tabs of the retaining ring are engaged with the splines and the plug is then inserted into the bore to retain the ring on the stud. The stud is thereby captivated to the panel. The manner of installing the ring permits a more rigid and closely fitting retaining ring to be used as a captivating means and thus the ring is more resistant to accidental displacement than more flexible retaining rings.

2 Claims, 5 Drawing Figures

U.S. Patent  Dec. 7, 1976  3,995,675
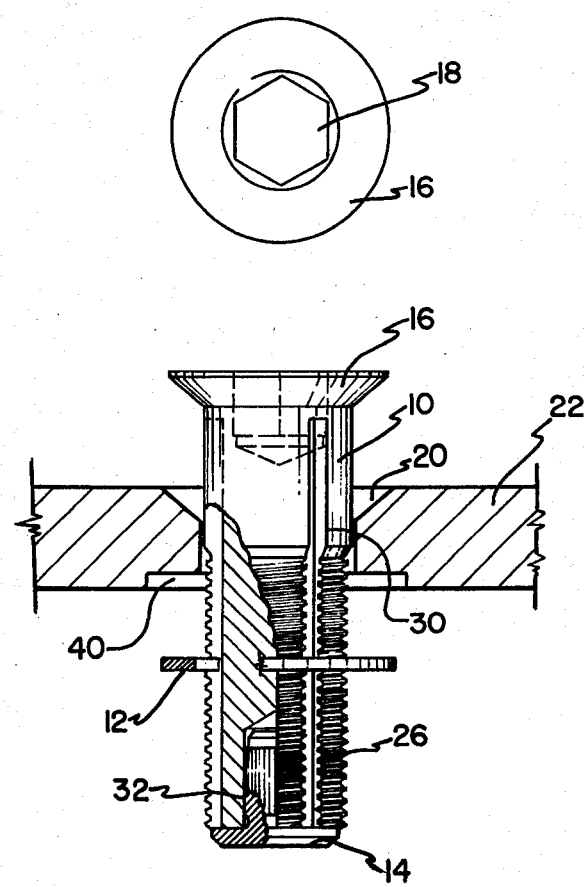
FIG 2
FIG 1
FIG 4
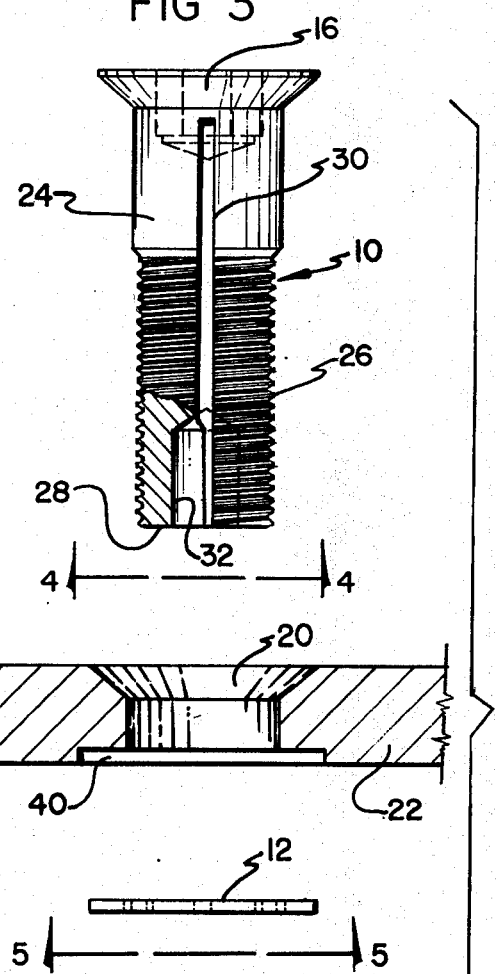
FIG 3
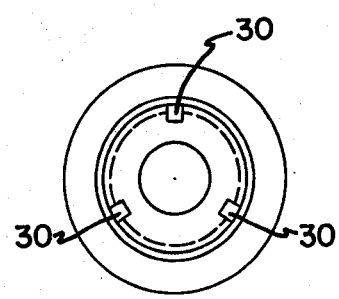
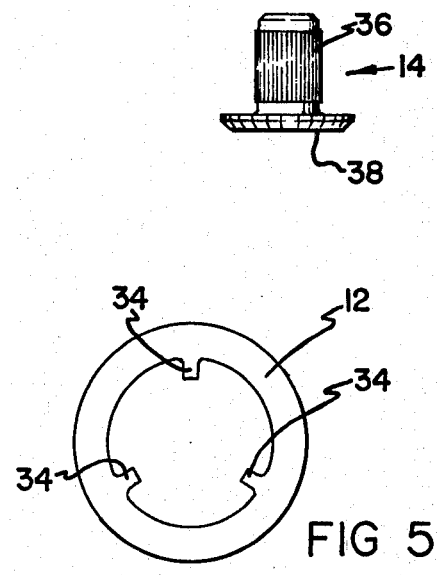
FIG 5

CAPTIVE PANEL FASTENER ASSEMBLY

BACKGROUND OF THE INVENTION

This invention relates to a captive panel fastener assembly, and more particularly to a captive panel fastener assembly particularly suitable for being captivated to panels such as aircraft panels and the like.

Panel fasteners for aircraft cowlings and other aircraft panels are well known in the art. In the customary means of assembly, a stud with an enlarged head is inserted through the opening of the panel and into a nut member attached to the base structure of the aircraft. The stud is then torqued to secure the panel. To prevent the stud from falling out of the panel when removed from the nut and possibly being lost, or falling into a jet engine intake and thereby damaging the engine, the stud is usually coupled with a retaining means which captivates the stud to the panel.

One such captivated panel fastener is shown in U.S. Pat. No. 3,294,140. As seen in this patent, the stud has an enlarged head and three splines extending intermediate its length. A retaining ring formed with integral tabs is snapped over the unsplined leading end of the stud and the tabs placed in the splines. Once in place, the retaining ring and the enlarged head of the stud function as stops to captivate the stud and prevent it from being displaced from the panel. In this embodiment, the retaining ring must be relatively flexible, and the tolerances between the tabs and the spline must be relatively loose to permit the ring to be snapped over the leading end of the stud.

Because of the flexibility of retaining ring and the loose tolerances between the splines and the tabs, it as been found that the stud, particularly if cocked at an angle, can become accidentally detached from the retaining ring and resultantly from the panel. As mentioned above, this has important consequences if the stud cannot be located and the plane is in an inaccessible area, or if the stud were to fall into the jet engine intake and damage the engine.

Therefore, it is an object of this invention to provide a captivated stud retaining ring which will not become displaced after installation.

Another objective of this invention is to provide a captive panel fastener assembly with a stiff retaining ring and a close-fitting relationship between the stud and the retaining ring of the assembly.

A further object of this invention is to provide a captive panel fastener assembly with a retaining ring which can be installed without deforming the ring and without the necessity of special tools.

Still another object of this invention is to provide a captive panel fastener assembly which is economical and feasible to manufacture.

Further objects of the invention will in part be obvious and in part appear hereafter.

The invention comprises a captive panel fastener assembly comprising a stud, retaining ring and end plug. The stud is formed with an enlarged head, three splines extending substantially along its length and a centrally located bore at its forward end. After the stud is inserted into a panel hole, of a diameter smaller than the enlarged head of the stud, tabs of the retaining ring are inserted into the splines of the stud and the end plug is then press-fitted into the stud bore to retain the ring. The stud is thus captivated to the panel. As the retaining ring is relatively rigid and the clearance between the tabs and the splines substantially close, the retaining ring is prevented from "walking" over the leading end of the stud and thereby becoming displaced.

BRIEF DESCRIPTION OF THE DRAWINGS

For a fuller understanding of the nature and object of the invention reference should be had to the following detailed description taken in connection with the accompanying drawing in which:

FIG. 1 is an elevational view, partially in cross-section, showing the stud captivated to a panel, only a portion of the panel is shown;

FIG. 2 is a top view of the head of stud shown in FIG. 1;

FIG. 3 is an exploded elevational view of the captivated stud assembly of FIG. 1 with the panel member shown only in part;

FIG. 4 is a bottom view of the stud taken along the lines 4—4 of FIG. 3; and

FIG. 5 is a bottom view of the retaining ring taken along the lines 5—5 of FIG. 3.

Similar reference characters refer to similar parts throughout the several views of the drawings.

DETAILED DESCRIPTION OF PREFERRED EMBODIMENTS

The invention accordingly comprises the features of construction, combination of elements, arrangement of parts which will be exemplified in the construction hereinafter set forth and the scope of the invention will be indicated in the claims.

As illustrated in the drawings, the captive panel fastener assembly comprising the invention consists of a stud 10, a retaining ring 12 and an end plug 14.

The stud is formed with an enlarged head 16 having a drive tool recess 18 therein. The head of the fastener is also preferably chamfered to engage with a countersink 20 of a panel 22, only a portion of which is shown, in a manner such that the top surface of the head of the stud is flush with the surface of the panel when the stud is fully installed. The stud also includes a smooth shank portion 24 adjacent the head of the stud and a threaded portion 26 leading from the shank portion to the forward end 28 of the stud.

Extending substantially along the length of the stud beginning adjacent the head at one end of the stud and terminating at the forward end of the stud are three equidistant splines or keyways 30. A centrally located bore 32 extends inwardly at the forward end of the stud.

As best seen in FIG. 5, the retaining ring 12 is provided with inwardly extending tabs 34 for engagement with splines 30 of the stud. The dimensions of splines 30 and the tabs 34 are such that when the tabs are engaged with the splines, there is a minimal sliding clearance between the members. This keeps the retaining ring substantially perpendicular to the axis of the stud and resultingly from being cocked at an angle and possibly displaced from the stud. Moreover, threads 26 of the studs are truncated at their minor diameter to permit the depth of the splines to extend below the thread for the purpose of permitting the tabs to slide within the splines without thread interference, but yet to keep the depth of the splines at a minimum so as not to unduly detract from the strength of the stud.

The third member, end plug 14, consists of a partially knurled mandril 36 coupled with a flange 38. The mandril portion of the plug is adapted to be press-fitted into the bore 32 of the stud until flange 38 is contiguous with the leading end 28 of the stud 10 as shown in FIG. 1. The mandril portion is preferably knurled to enable the tolerances for a press-fit between the plug and the bore be greater, for ease of manufacture, than otherwise with a smooth mandril. With a knurled face, if the mandril is slightly oversized, the leading edges of the knurl will collapse and still allow the plug to be inserted.

The diameter of flange 38 is slightly less than the minor diameter of the thread of the stud so that the flange will not interfere when the stud is inserted into a nut, not shown, and the bottom portion of the flange is preferably chamfered to guide the stud into the nut. However, the flange diameter is sufficiently large to act as an abutment and retain the retaining ring on the stud.

Panel member 22 is preferably formed with a counterbore 40 at its inner face to receive the retaining ring 12 and thus allow the panel to be flush with its mating member when secured thereto. If desired, the retaining ring can be attached within the counterbore to the panel.

In assembly, the stud is first inserted through the opening of the panel. Afterwards, the tabs of the retaining ring are placed into the splines at the leading end of the stud and the ring slid on the stud. The end plug is then pressed into the bore of the stud by conventional tools to retain the retaining ring in place. So assembled, the stud is captivated to the panel by the enlarged head 16 of the stud and retaining ring 12. The retaining ring is free to slide on the stud between the contained limits of the end plug and panel face.

From the above description, the advantages of the captive panel fastener assembly should now be apparent. As the retaining ring is engaged with the splines merely by being inserted into the splines at the forward end of the stud, it can be rigid and closely fitted with the splines. Thereafter, when the retaining ring is retained in place by the plug, it will not become displaced by being inadvertently snapped over and off the leading end of the fastener. Moreover, since the splines extend completely to the leading end of the stud, if desired, the stud can be pulled out completely until the bottom end of the stud is flush with the panel member whereby the stud will not interfere when the panel is being aligned with the member to which it is to be attached. Further, the manner of assembly allows the stud to be captivated to the panel quickly and easily with conventional tools and the simplicity of the parts allow the assembly to be both economically and feasibly manufactured.

While I have typically described certain specific embodiments of my invention, it is of course understood that the invention is not limited to these particular forms, but rather is applicable broadly to numerous variations falling within the scope of the appended claims.

I claim:

1. A captivated panel fastener assembly comprising a stud having an enlarged head, driving means in said head, a smooth shank portion adjacent said head and a threaded portion leading from said shank portion to the forward end of said stud, said threaded portion having a truncated minor diameter, said stud having three or more splines extending below said truncated minor diameter of the threads and axially from the forward end of said stud to a point adjacent but beneath the head of said stud, said stud having a central bore at its forward end, an annularly continuous substantially rigid retaining ring having inwardly extending tabs slidably riding within said splines, said retaining ring riding substantially perpendicular to the longitudinal axis of said stud, said tabs and said splines having minimal sliding clearance therebetween maintaining said retaining ring in said substantially perpendicular position, an end plug having a knurled mandril portion and an integral flange at one end thereof, said mandril portion being press-fitted within said bore of said stud such that the flange is contiguous to the forward end of said stud, said flange having a diameter slightly smaller than the minor diameter of the threaded stud but larger than the inner diameter of said tabs whereby said flange stops said retaining ring from being withdrawn from said forward end of said stud, and said flange being chamfered toward its outward face to facilitate engagement with a nut member.

2. The panel fastener of claim 1 in combination with a panel member, said panel member having a hole to receive said stud and a counterbore on one face thereof to receive said retaining ring, and said hole in said panel member having a diameter smaller than either the diameter of said enlarged head of said stud or said retaining ring.

* * * * *